Sept. 17, 1968     G. P. MATHEWS ET AL     3,401,606
INTERNALLY BREATHING BRAKE ACTUATOR
Filed Oct. 24, 1966
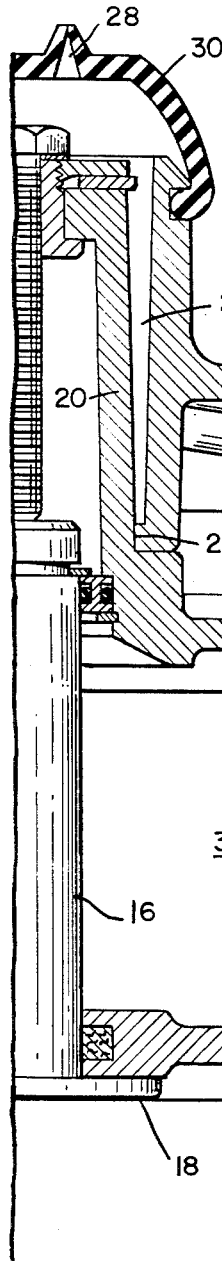
FIG_1
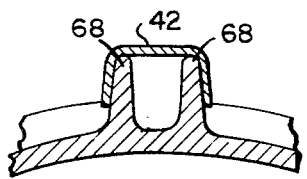
FIG_4
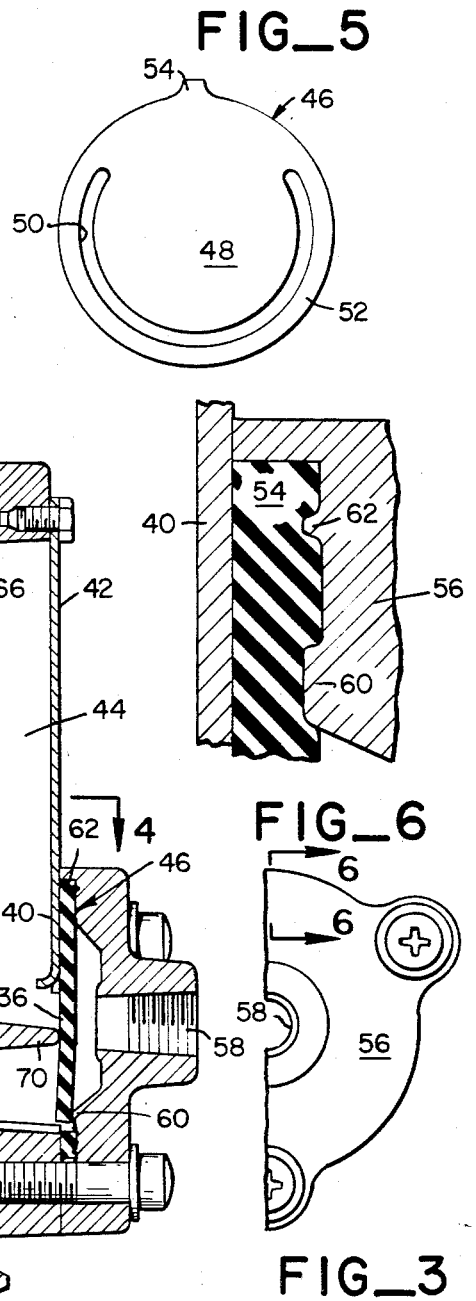
FIG_5
FIG_6
FIG_3
INVENTORS
GEORGE P. MATHEWS
ALLEN L. GUMMER
BY
Mellin, Moore & Weissenberger
ATTORNEYS

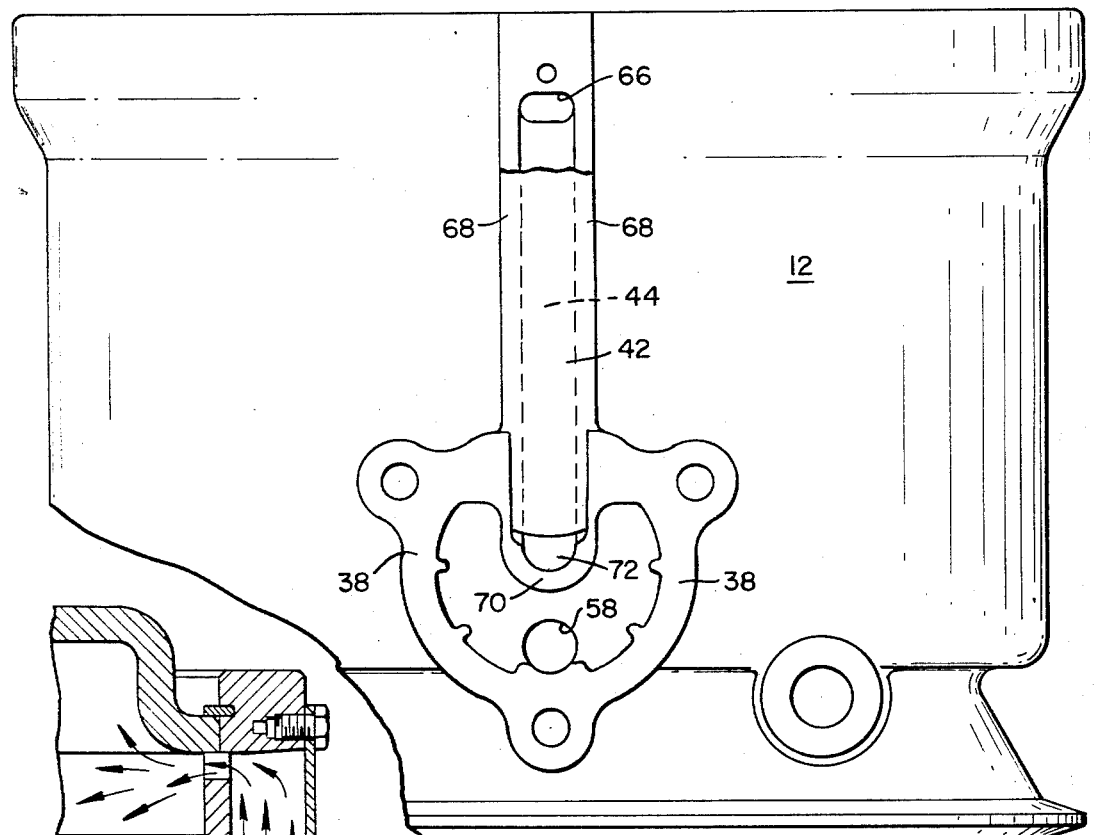
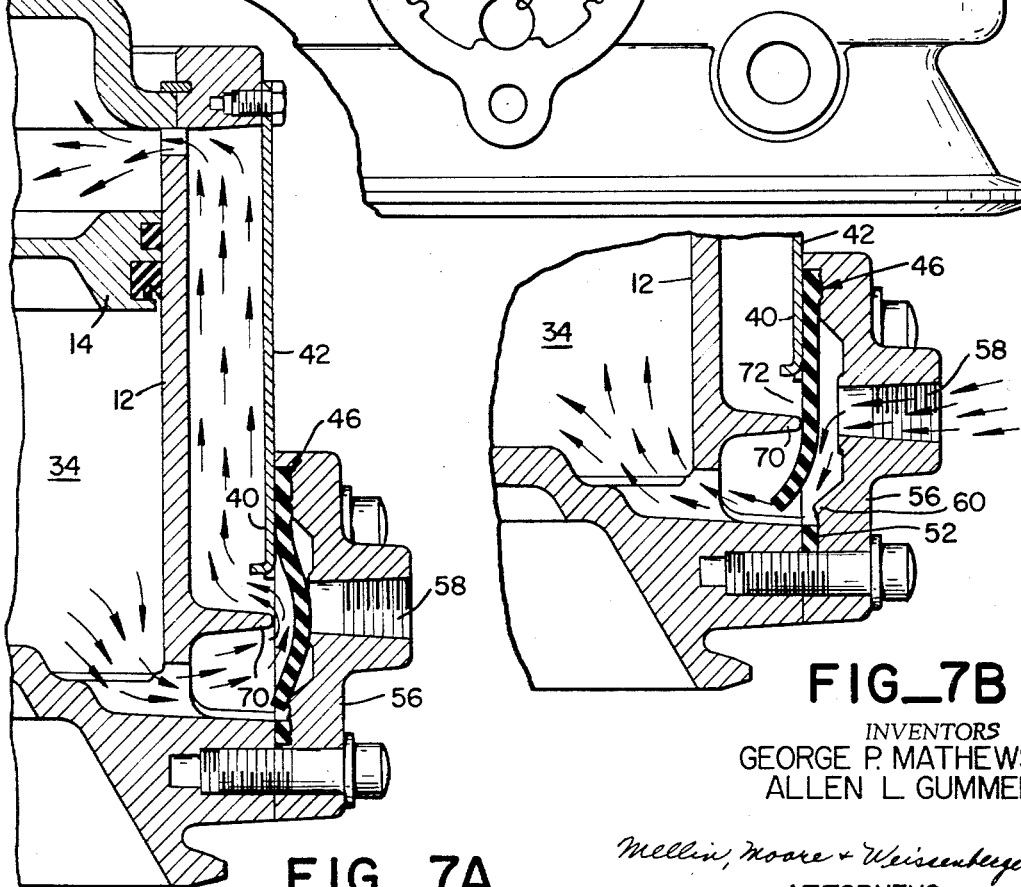

United States Patent Office 3,401,606
Patented Sept. 17, 1968

3,401,606
INTERNALLY BREATHING BRAKE ACTUATOR
George P. Mathews and Allen L. Gummer, Cloverdale, Calif., assignors to MGM Brake Inc., Cloverdale, Calif., a corporation of California
Filed Oct. 24, 1966, Ser. No. 588,884
6 Claims. (Cl. 91—433)

This invention relates to brake actuating devices, and more particularly to a spring-powered internally breathing brake actuator in which the internal breathing function is combined with the function of a quick release valve, and which is capable of being modulated.

In addition to the usual service brake system, vehicles equipped with air brakes normally have an emergency brake actuating system which comes into play both when the vehicle is parked and when for any reason the supply pressure for the service brake actuating system is lost.

Usually, devices of this type include a normally compressed spring which, when released, exerts sufficient force to actuate the brakes of the vehicle. This spring is normally held compressed by compressed air which may be derived either from the dry tank of the service brake system or from a separate emergency supply isolated from the service brake system. The compression of the spring by the compressed air from the emergency supply is preferably accomplished by having the emergency air act on a piston or diaphragm movable in a cylinder so as to compress the spring.

When it is desired to use the emergency system to apply the brake, the air in the supply line to the emergency actuator is exhausted to atmosphere. This causes a quick release valve connected to the air chamber of the emergency brake actuator to open and to rapidly exhaust the air from the air chamber of the emergency brake actuator, whereupon the spring is released to exert a brake-applying force on the vehicle's brakes.

The present invention represents an improvement over United States Patent No. 3,107,583 to E. R. Woodward in that it has the capability of permitting a modified operation of the emergency brake actuator; i.e., the system of the present application permits continuous graduated control of the air pressure on the piston of the emergency brake actuator so that the vehicle may be braked by the use of the emergency brake system with substantially the same fine control as is afforded by the regular service brake air system.

The device of the present invention accomplishes this result by providing, integrally with the emergency brake actuator mechanism, a quick release valve mechanism which is arranged to maintain in the air chamber of the emergency brake actuator a pressure differing by only a few p.s.i. from the pressure transmitted from the emergency tank through the emergency brake control valve. If the pressure in the supply line from the emergency brake control valve to the emergency brake actuator drops substantially below the pressure in the air chamber of the emergency brake actuator, the latter is quickly vented internally to the spring side of the emergency brake actuator piston so that the spring is enabled to rapidly follow the control command resulting from the actuation of the emergency brake control valve.

In addition, the internal breathing feature made possible by the present mechanism prevents the necessity of drawing air from the outside into the spring chamber and thus eliminates the possibility of drawing into the spring chamber corrosion-producing salt, moisture and dirt which may be contained in the outside air in which the vehicle is moving.

It is therefore the object of this invention to extend the life of an emergency brake actuator by preventing the introduction of atmospheric air containing dust, salt and moisture into the actuating unit.

It is a further object of the invention to obtain a rapid application of the emergency brake actuator by providing a pressure releasing valve integral with the emergency brake actuator instead of remote therefrom.

It is a further object of the invention to provide an emergency brake actuator of the type described which is capable of being modulated.

These and other objects of the invention will become apparent from a perusal of the following specification, taken in connection with the accompanying drawings in which:

FIG. 1 is a fragmentary vertical section through the emergency brake actuator of this invention;
FIG. 2 is a side elevation of the device of FIG. 1 with the quick release mechanism removed;
FIG. 3 is a fragmentary side elevation of the quick release valve mechanism;
FIG. 4 is a fragmentary horizontal section along line 4—4 of FIG. 1;
FIG. 5 is a side elevation of the resilient valve element of the quick release valve according to this invention;
FIG. 6 is a fragmentary section along line 6—6 of FIG. 3;
FIG. 7A is a fragmentary vertical section similar to FIG. 1 showing the air flow during activation of the emergency brake actuator; and
FIG. 7B is a fragmentary section analogous to FIG. 7A but showing the air flow upon return to the hold-off condition of the emergency brake actuator.

Basically, the invention consists of providing an emergency brake actuator with an integrally formed quick release valve which discharges into an internal breathing conduit. Upon application of pressure through the control line from the air supply to the actuator, air is admitted into the air chamber of the emergency brake actuator; and upon reduction of the air pressure in the control line the air in the air chamber of the actuator discharges not directly to atmosphere, but into the internal breathing conduit which conducts the discharged air into the spring chamber of the emergency brake actuator. Any excess air not needed to fill the expanding spring chamber is vented out of the spring chamber to the atmosphere. Provision is made for so shaping and supporting the quick release valve element that it can serve both as a gasket and as a quick release valve capable of responding to a pressure differential in either direction of only a few pounds.

Referring now to FIG. 1, the emergency brake actuator of this invention is generally shown at 10. The actuator 10 has a cylindrical outer housing 12 which contains the upwardly and downwardly movable piston 14. The motion of the piston 14 is transmitted through a push rod 16 to a head 18 which cooperates with the service brake actuator mechanism (not shown) of the vehicle in a known manner to apply the brake when the piston 14 is being moved downwardly within the housing 12. The upper portion 20 of the piston 14 is guided in the neck 22 of the housing 12 with a loose fit so that any unneeded air contained in the spring chamber 24 can readily escape through passage 26 and through the opening 28 in the resilient cap 30 to the atmosphere. The spring chamber 24 contains the actuating spring 32 which biases the piston 14 in a downward direction in FIG. 1, and which is normally held compressed by air under pressure contained in the air chamber 34 which holds the piston 14 in its uppermost position.

The operation of the piston 14 is regulated by the quick release valve 36 which is mounted on an appropriate mounting surface 38 on the side of the housing 12 (FIG.

2). The mounting surface 38 and the tongue 40 of the cover 42 covering the internal breathing passage 44 cooperate to form a continuous annular sealing surface which supports the outer rim of a resilient sealing disk 46 most clearly shown in FIG. 5. The sealing disk 46 is made up of a central portion 48 partially surrounded by a slot 50 and connected along the remainder of its periphery to the rim portion 52. The rim portion 52 is provided with a small locator boss 54 which engages an appropriate locator notch (not shown) in the cover 56 in such a manner as to assure assembly of the valve disk 46 on the mounting surface 38 in FIG. 2 in the position shown in FIG. 5.

The quick release valve cover 56 is provided with a central opening 58 to which an air supply line can be fitted. The opening 58 constitutes the connection of the actuator 10 to the supply line from the emergency brake control valve (not shown) which may be mounted at some convenient place in the vehicle accessible to the operator during operation.

As more clearly shown in FIGS. 6 and 7, the inner surface of the cover 56 is provided with a pair of annular protuberances 60 and 62 to serve specific purposes. The protuberance 62 is a holding and compressing ring which engages the rim portion 52 of the valve disk 46 and holds the rim portion 52 tightly against the mounting surface 38 and tongue 40, respectively. This tight compression of the rim portion 52 against mounting surface 38 and tongue 40 not only assures an air-tight seal along the perimeter of the rim portion 52, but also causes the resilient material of the disk 46 to sealingly enter the small groove which exists between mounting surface 38 and tongue 40 as a result of normal manufacturing tolerances, even though the mounting surface 38 and the outer surface of tongue 40 are coplanar.

The inner annular protuberance 60 on the inside of cover 56 acts as another compressing boss along the upper portion of the valve disk 46; but along the lower portion, i.e. the portion adjacent the slit 50, it serves as the inlet valve seat as best shown in FIGS. 1 and 7 for the purposes hereinafter described.

The air chamber 34 communicates with the quick release valve 36 through an opening 64, and the spring chamber 24 communicates with the quick release valve 36 through opening 66 and air passage 44. The air passage 44, it will be understood, is defined by a pair of ridges 68 formed in the body of the housing 12 and covered by the air-tight cover 42 (FIG. 4).

The operation of the device of this invention is as follows: Normally, during the operation of the vehicle, the parts of the device are in the position shown in FIG. 1. In this condition, the air chamber 34 contains air under a pressure of, say, 98 p.s.i., and the supply line connected to the inlet 58 contains air under a slightly higher pressure, say 100 p.s.i. As will be hereinafter explained, the pressure differential between the air in air chamber 34 and the air at inlet 58 may be about 2 to 3 p.s.i. either way without changing the conditions shown in FIG. 1.

If the air pressure in chamber 34 and inlet 58 is exactly equal, the valve disk 46 will be in the condition shown in FIG. 1. In this condition, it will be noted that although the disk 46 is generally held in a vertical plane, the center of the central portion 48 is deflected around the exhaust valve seat 70 which surrounds the opening 72 leading to the air passage 44, as best shown in FIG. 2. The bending is accomplished by the protrusion of inlet valve seat 60 into the plane of disk 46. It will be understood that by thus deflecting the central portion 48 of the disk 46 between the valve seats 60 and 70, the inherent resiliency of the disk 46 will cause the disk to seat against the seats 60 and 70 with a positive closing pressure. The actual value of that pressure is dependent upon the thickness and the resiliency of the disk 46, and upon the relative height, in a lateral direction in FIG. 1, of the valve seats 60 and 70. In practice, it is desirable for positive seating and smooth modulation of the emergency brake system to hold this inherent pressure to within a range on the order of about 2 to 3 p.s.i. air pressure differential.

Let it be assumed now that the operator wishes to actuate the emergency brake either in order to park the vehicle or because the service brake system has failed. To accomplish this, the operator opens the emergency brake control valve (not shown) sufficiently to cause the air pressure at the inlet 58 to fall to a desired level, say 20 p.s.i. When the air pressure at inlet 58 falls 2–3 p.s.i. below the air pressure in chamber 34, exceeding the inherent seating pressure of valve disk 46 (i.e. the inlet pressure falls below about 95–96 p.s.i.), the pressure in chamber 34 will begin to force the central portion 48 of valve disk 46 off the seat 70, and air will begin to flow in the direction of arrows A of FIG. 7A. It will be noted that in this condition, the air removed from chamber 34 is conducted through the internal breathing passage 44 to the upper side of piston 14, so that it becomes unnecessary to draw atmospheric air into the spring chamber 24 as the piston 14 descends and the spring chamber 24 expands.

Since the air in chamber 34 was under considerable pressure, and the spring chamber 24 is effectively vented to atmosphere through passage 26 and opening 28, it will be understood that some of the air entering spring chamber 24 through passage 44 will be excess to the requirements of the expansion of spring chamber 24 during the descent of piston 14, and this excess air will be vented to the outside through passage 26 and opening 28.

When the pressure in chamber 34 has been lowered by the flow of air along the path shown in FIG. 7A to the point (say 22 p.s.i.) where it differs by only 2 or 3 pounds from the pressure at inlet 58, the natural seating pressure of disk 46 once again takes over and returns the disk 46 to the condition shown in FIG. 1. If it is now desired to release the brake, the operator increases the pressure at inlet 58 to, say, 100 p.s.i. by appropriate action of the emergency brake control valve. As soon as the pressure at inlet 58 begins to exceed the pressure in chamber 34 by about 2 to 3 p.s.i. (i.e. rises to 24–25 p.s.i.) the central portion 48 of disk 46 will become unseated from seat 60, and air flow will take place as shown in FIG. 7B. As a result, the pressure in chamber 34 will increase, the piston 14 will rise, the spring 32 will again compress, and the excess air trapped in spring chamber 24 will be exhausted to the atmosphere through passage 26 and opening 28. As soon as the pressure in chamber 34 has risen to within 2–3 p.s.i. of the level of the pressure at inlet 58 (i.e. to about 97–98 p.s.i.), the disk 46 will once again return to the condition of FIG. 1 under its own resiliency.

It will be seen that the above-described operation permits control of the pressure in air chamber 34 to within 2 or 3 p.s.i. of the pressure at inlet 58 at any desired pressure level. Consequently, it will be understood that by varying the pressure at inlet 58 as desired, by appropriate action of the emergency brake control lever (not shown), the operator can modulate the emergency brake actuator of this invention and use it to control the motion of the vehicle at will in the same manner as with the service brake system. It should be understood that the result of this invention could not be achieved by connecting the air chamber 34 directly to the emergency brake control valve, as the physical remoteness of that valve from the brake actuator would introduce intolerable delays in response upon application of the brake.

It will be further understood that due to the internal venting feature of the brake actuator described herein, no atmospheric air is ever admitted to the interior of the brake actuator housing 12, no matter how much the actuator is used. Consequently, the danger of corrosion resulting from the intake of atmospheric air containing dust, moisture or salt is completely avoided, and the life of the device is significantly prolonged. Also, it will be noted that the exhaust path through passage 44 is extremely short, and therefore actuation of the emergency brake system shown here is practically instantaneous, even faster than with conventional quick-release systems having quick-release valves located a few feet away from the brake actuators to serve a plurality of actuators.

One purpose of the tongue 40 of cover 42 is to support the disk 46 adjacent the opening 72, so that the material of the disk 46 cannot be concavely pushed into the opening 72. It is necessary to avoid such penetration of the disk 46 into the opening 72 because any deformation of disk 46 in its upper part has been found to set up internal stresses in the disk 46 which prevent its operation in the manner described, particularly upon discharge of air from chamber 34.

It will be seen that the concepts of the invention can be carried out in many different ways of which the present embodiment is merely illustrative. Consequently, we do not desire to be restricted by the embodiment shown and described, but only by the scope of the following claims.

Having thus described the invention, the following is claimed:

1. In an air brake actuator having an emergency section housing, an emergency piston or diaphragm in said housing, and means for moving said piston or diaphragm to thereby actuate said brake in the absence of service pressure, that improvement which comprises:
   an intake port defined by said emergency housing and disposed rearwardly of the rearward limit of movement of said piston or diaphragm;
   an exhaust port defined by said emergency housing and disposed forwardly of the said forward limit of movement of said piston or diaphragm;
   a channel defined by said housing extending axially along said emergency section housing from said intake port to said exhaust port, said channel having a wall disposed adjacent said exhaust port and between said exhaust port and said intake port;
   a cover plate over a portion of said channel and running from said intake port to adjacent but spaced from said wall;
   cover means over the remainder of said channel and running from said cover plate to said housing and passing over and spaced from said wall and said exhaust port and including a service pressure inlet;
   a cantilevered flexible valving element held only at one portion thereof between said cover plate and said cover means and extending between and seatable against and unseatable from said wall and a portion of said cover means, said portion of said cover means being further along said valving element from said held portion than said wall.

2. The air brake actuator of claim 1 wherein said cantilevered valving element has a circular interior section and a circular exterior section, said interior section being cantilevered from said exterior section.

3. The brake actuator of claim 2 wherein said means covering said exhaust port comprises a rigid cap secured to said housing in contiguous relationship with said circular exterior section of said valving element.

4. A modulatable emergency brake actuator comprising:
   a housing defining a cavity;
   an actuator element reciprocable in said cavity and including piston means dividing said cavity into front and rear air chambers;
   means biased to actuate said actuator element into a brake-applying condition;
   pressurization of said front air chamber means being adapted to hold said actuator element out of said brake-applying condition;
   means unidirectionally venting said rear air chamber means to the atmosphere; and
   quick release valve means associated with said housing;
   said valve means comprising air intake passage means, passage means communicating with said front air chamber, and passage means communicating with said rear air chamber, and a valve element interposed between said passage means; and
   said valve element including a flat resilient member secured with respect to said housing at one end, supported at its center by wall means separating said front and rear air chamber passage means and biased out of its plane adjacent its periphery at the other end by valve seat means extending into its plane along said front air chamber passage means;
   whereby the air presure in said front air chamber follows the air pressure in said intake passage means within small limits determined by the resiliency of said valve element.

5. A quick-release valve for mounting on emergency brake actuators having a housing, comprising:
   a cover mounted on said housing;
   a resilient disc whose perimeter is held in sealing relationship between said cover and said housing, said disc having a slot extending along a portion of its periphery and inwardly thereof;
   a first valve seat formed on said cover inwardly of said slot and generally parallel thereto;
   a second valve seat formed on said housing inwardly of said first valve seat and generally parallel thereto;
   at least one of said valve seats protruding into the plane of said disc;
   first passage means in said cover;
   second passage means in said housing communicating with said first passage means in one position of said resilient disc; and
   third passage means in said housing communicating with said second passage means in another position of said resilient disc;
   whereby air will move from said first passage to said second passage when the pressure in said first passage exceeds the pressure in said second passage, and from said second passage to said third passage when the pressure in said second passage exceeds the pressure in said first passage, said valve being closed when said pressures in said first and second passages are substantially equal.

6. The device of claim 5, in which said disc is supported on the side of said housing over a sufficient area to prevent its deformation toward said housing inwardly of said second valve seat.

References Cited

UNITED STATES PATENTS 3,302,530   2/1967   Dobrikin et al. _____ 91—440

FOREIGN PATENTS 103,113   12/1963   Norway.

MARTIN P. SCHWADRON, *Primary Examiner.*

C. B. DORITY, Jr., *Assistant Examiner.*